United States Patent [19]

Nagumo et al.

[11] 4,116,179
[45] Sep. 26, 1978

[54] DUAL SPARK-IGNITION INTERNAL COMBUSTION ENGINE

[75] Inventors: Shin-ichi Nagumo; Yoshimasa Hayashi, both of Yokohama; Kizuku Otsubo, Kokubunji, all of Japan

[73] Assignee: Nissan Motor Company, Limited, Yokohama, Japan

[21] Appl. No.: 765,770

[22] Filed: Feb. 4, 1977

[30] Foreign Application Priority Data

Feb. 6, 1976 [JP] Japan .................... 51-11912

[51] Int. Cl.² ............................................. F02M 25/06
[52] U.S. Cl. .................................................. 123/119 A
[58] Field of Search .......... 123/119 A, 191 A, 191 R, 123/148 C, 148 DS, 90.27, 52 M, 59 R; 60/278, 323

[56] References Cited

U.S. PATENT DOCUMENTS

| | | | |
|---|---|---|---|
| 1,171,211 | 2/1916 | Keiper | 123/50.27 |
| 1,459,630 | 6/1923 | Spina | 123/90.27 |
| 1,722,145 | 7/1929 | Hermann | 123/119 A |
| 2,257,631 | 9/1941 | Wahlberg | 60/323 |
| 2,576,819 | 11/1951 | Angle | 123/41.69 |
| 3,164,143 | 1/1965 | Dolza | 123/90.27 |
| 3,219,019 | 11/1965 | Palmer | 123/90.27 |
| 3,885,538 | 5/1975 | Suter | 123/119 A |
| 3,901,203 | 8/1975 | Pozniar | 123/119 A |
| 3,945,365 | 3/1976 | Regueiro | 123/148 DS |
| 4,031,867 | 6/1977 | Yasuda et al. | 123/119 A |

FOREIGN PATENT DOCUMENTS 2,621,533  9/1976  Fed. Rep. of Germany ....... 123/148 C Primary Examiner—Wendell E. Burns
Attorney, Agent, or Firm—Bacon & Thomas

[57] ABSTRACT

Each combustion chamber of an internal combustion engine is divided into four generally equal imaginary parts by a longitudinal vertical imaginary plane parallel with the longitudinal axis of the cylinder head of the engine and a lateral vertical imaginary plane perpendicular to the longitudinal vertical imaginary plane. Two spark plugs, and intake and exhaust valves are disposed on the cylinder head wall surface defining the upper part of the combustion chamber, and located at the four generally equal imaginary parts, respectively.

17 Claims, 5 Drawing Figures

DUAL SPARK-IGNITION INTERNAL COMBUSTION ENGINE

BACKGROUND OF THE INVENTION

1. Field of the Invention

This invention relates to a combination of an improved combustion chamber configuration and a dual spark-ignition internal combustion engine which is arranged to lower the emission level of nitrogen oxides by supplying a portion of the exhaust gases into the combustion chamber of the engine.

2. Description of the Prior Art

In connection with the control of nitrogen oxides (NOx) generated during the combustion carried out in the combustion chamber of an internal combustion engine, it has been proposed that a considerably large amount of the exhaust gases of the engine is supplied to the combustion chamber to mix with an air-fuel mixture inducted into the combustion chamber, and then the air-fuel mixture mixed with the exhaust gases is ignited with two spark plugs disposed in the combustion chamber. With this proposition, the combustion chamber volume alotted to one spark plug is decreased compared with a prior art arrangement in which only one spark plug is disposed in each combustion chamber. As a result, the time required for the combustion carried out in the combustion chamber is shortened and accordingly stable combustion is obtained even under the condition of which a considerably large amount of the exhaust gases is supplied to the combustion chamber. This stable combustion causes stable and smooth running of the engine. Of course, the generation of NOx in the combustion chamber is suppressed by lowering the maximum temperature of the combustion due to the supply of the considerably large amount of exhaust gases into the combustion chamber, and therefore NOx emission level is effectively lowered.

Now, the thus arranged engine is required to improve or further shorten the combustion time of the air-fuel mixture in the combustion chamber in order to achieve more stable and smooth running of the engine. To meet this requirement, suitable locations of two spark plugs must be found in consideration of the relationship with intake and exhaust valves, since the combustion chamber volume is not sufficiently large for the disposition of the spark plugs and the intake and exhaust valves.

SUMMARY OF THE INVENTION

According to the present invention, two spark plugs and an intake and an exhaust valve are located respectively at four equal imaginary parts of each internal combustion engine combustion chamber which is arranged to receive a considerably large amount of the exhaust gases into the combustion chamber.

It is the prime object of the present invention to provide an improved internal combustion engine which can run more stably and smoothly even under the condition in which a considerably large amount of the exhaust gases is fed into the combustion chamber, compared with the prior art engine.

Another object of the present invention is to provide an improved internal combustion engine in which two spark plugs, and an intake and an exhaust valve are suitably located to attain the most shortened combustion time and to prevent various problems among the spark plugs and the valves, without causing difficulties in design and production and without making major modifications to other engine constituting parts.

Other objects, features, and advantages of the engine according to the present invention will be more apparent from the following description of the preferred embodiment thereof taken in conjunction with the accompanying drawings.

DESCRIPTION OF THE PREFERRED EMBODIMENT

Figure 1:
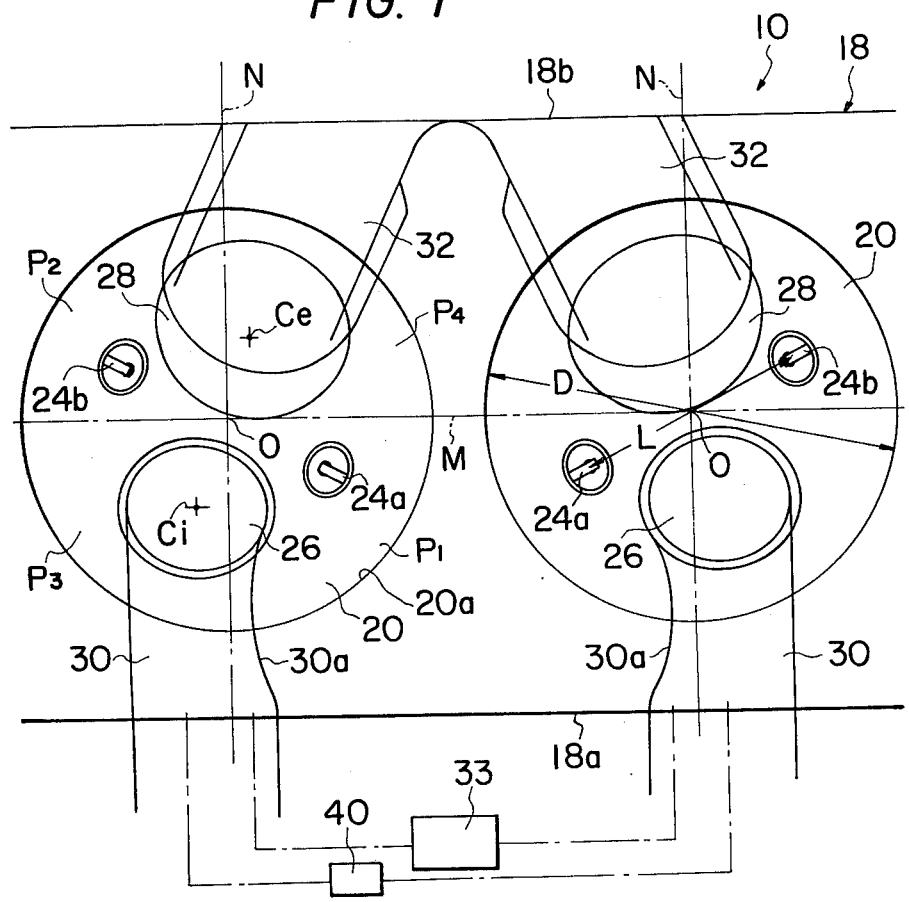
FIG. 1 is a schematical plan view of the cylinder head of a preferred embodiment of an internal combustion engine in accordance with the present invention.
Figure 2:
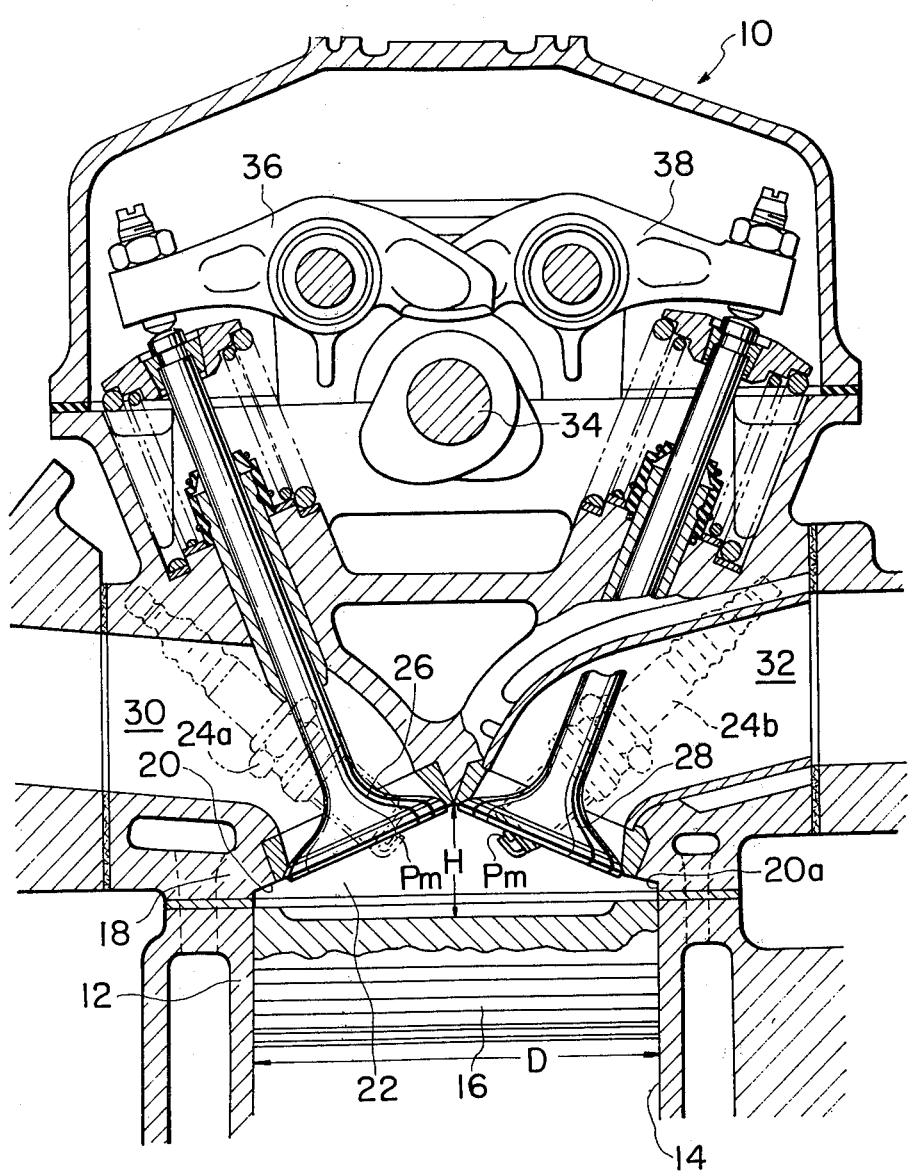
FIG. 2 is a vertical section view of a part of the engine of FIG. 1.

Referring now to FIGS. 1 and 2 of the drawings, there is shown a preferred embodiment of an internal combustion engine, generally designated by the reference numeral 10, which is composed of a cylinder block 12. Formed in the cylinder block 12 is a cylinder 14 or cylinders in which a piston 16 or pistons are, as usual, disposed reciprocally movable toward and away from a cylinder head 18 which is secured to the top surface of the cylinder block 12. The cylinder head 18 is formed with a concavity 20 of a circular shape in plan as clearly shown in FIG. 1 so that the circular periphery 20a of the concavity 20 corresponds to the bore of the cylinder 14.

A combustion chamber 22 is defined between the surface of each concavity 20 and the crown of each piston 16. The combustion chamber 22 may be of generally symmetrical shape, such as, a hemispherical type, a pan-cake (flat cylindrical) type, a bath-tub type, or a heron type. Preferably, the combustion chamber 22 is basically is of the shape of a body of rotation the axis of which corresponds to the cylinder center axis O, such as the hemispherical or the pan-cake type. As seen in FIG. 1, two spark plugs 24a and 24b disposed at the surface of the concavity 20 defining the upper part of the combustion chamber 22 so as to project into the combustion chamber 22. An intake valve head 26 and an exhaust valve head 28 are seatably disposed respectively on intake and exhaust valve seats (no numerals) secured to the concavity surface. The two spark plugs 24a and 24b are disposed so that the midpoints $P_m$ between the side and center electrodes of the spark plugs are respectively located in first and second imaginary parts $P_1$ and $P_2$ of the combustion chamber 22 which parts are symmetrically opposite with respect to the center axis O of the cylinder 14. The first and second imaginary parts $P_1$ and $P_2$ are defined by a longitudinal vertical plane M parallel with the longitudinal axis of the cylinder 18 and passing through the cylinder center axis O, and a lateral vertical plane N perpendicular to the longitudinal plane M and passing through the cylinder center axis O. The intake and exhaust valve head 26 and 28 are disposed so that the centers $C_i$ and $C_e$ thereof are located in third and fourth imaginary parts $P_3$ and $P_4$ of the combustion chamber 22 which parts are symmetrically opposite with respect to the cylinder center axis O. The center axes (not identified) of the stems connected to the intake and exhaust valve heads 26 and 28 pass through the centers $C_i$ and $C_e$, respectively. As shown, this cylinder head 18 employs a so-called "cross-flow" induction-exhaust arrangement in which each intake port 30 communicable through each intake valve with each combustion chamber 22 opens to one side 18a of the cylinder head 18, while each exhaust port 32 communicable through each exhaust valve with each combustion chamber 22 opens to the opposite side 18b of the cylinder head 18. The reference numeral 33 represents means for supplying the combustion chamber 22 with an air-fuel mixture through the intake ports 30. In this case, the fuel is gasoline or petrol. The means 33 may be a carburetor. Additionally, the spark plug 24a and the intake valve head 26 are disposed opposite to the spark plug 24b and the exhaust valve head 28 with respect to the longitudinal vertical plane M.

In addition to the arrangement hereinbefore described, the two spark plugs 24a and 24b are located generally symmetrical with respect to the cylinder center axis O, and the distance L between the mid-points $Pm$ between the electrodes of the spark plugs 24a and 24b is selected within the range from 0.45 to 0.67 times the diameter D of the cylinder bore. As a result, the two spark plugs 24a and 24b can be located considerably far from the intake and exhaust valve heads 26 and 28 and accordingly, no location problem arises between them and the valve heads 26 and 28. Consequently, the combustion chamber spaces allotted respectively to the two spark plugs 24a and 24b become generally equal and therefore the combustion time of air-fuel mixture in the combustion chamber can be shortened, causing stable and smooth running of the engine. With respect to the above selected range of the distance L between the two spark plugs 24a and 24b: if the distance L is less than the lower level or 0.45 times the diameter D, the ignition of the air-fuel mixture is similar to that by only one spark plug disposed in the combustion chamber; if the distance L is larger than the upper level or 0.67 times the diameter D, the spark plugs are located adjacent the periphery of the combustion chamber and accordingly it is impossible to effectively use the flames produced by the spark plugs which flames spherically spread with the centers at the midpoints of the side and center electrodes of the spark plugs.

As best seen in FIG. 1, the centers $C_i$ and $C_e$ of the intake and exhaust valve heads 26 and 28 are spaced apart from each other regarding the longitudinal axis of the cylinder head 18. As a result, it becomes possible to increase the diameters of the intake and exhaust valve heads 26 and 28 and respective seats. Additionally, even in case where the intake and exhaust valve heads 26 and 28 are actuated by a cam shaft 34 through two rocker arms 36 and 38, respectively, as shown in FIG. 2, the rocker arms 36 and 38 can be located suitable so that no mutual location problem does arise. It is to be noted that, by the effect of the above configuration of the intake and exhaust valve heads 26 and 28, the intake air passing through the intake port 30 enters generally tangentially the combustion chamber 22 causing swirl turbulence of the intake air in the combustion chamber and consequently the homogenization of the air-fuel mixture and the vapourization of the fuel supplied into the combustion chamber are promoted, resulting in improvement of the combustion of the air-fuel mixture. In order to further promote and improve the generation of the swirl turbulence, a protruding or narrow-portion 30a is formed in the intake port 30, which also contributes to increase the locational range within which the spark plugs 24a and 24b are locatable.

In case where the two exhaust ports 32 communicable respectively with two adjacent combustion chambers 22 form a so-called siamesed exhaust port in which outlets of the two exhaust ports 32 are combined into one as shown in FIG. 1, the above-mentioned intake and exhaust valve configuration can cause the length of each exhaust port 32 to shorten so as to decrease the surface area of the siamesed exhaust port, improving exhaust gas temperature maintenance.

Referring back to FIG. 1, the reference numeral 40 represents means or device for recirculating of supplying a portion of the exhaust gases of the engine into the combustion chambers 22 through the intake ports 30. This exhaust gas recirculating device 40 is arranged to supply such a large amount of the exhaust gases as 20 to 40% by volume, at maximum, of the amount of the intake air supplied to the combustion chamber. By the effect of this exhaust gas recirculation, the maximum temperature of the combustion carried out in the combustion chamber is considerably lowered and consequently the generation of nitrogen oxides (NOx) in the combustion chamber is greatly suppressed.

Although the maximum combustion temperature is thus lowered, the amount of unburned constituents such as hydrocarbons (HC) is suppressed by the effect of above-mentioned shortened combustion time due to the two suitably arranged spark plugs 24a and 24b. In order to improve the above-described suppression effect of residual HC, it is preferably to decrease the combustion chamber surface area formed in the cylinder head 18 to prevent excessive lowering of the combustion temperature in the combustion chamber, because the temperature of the cylinder head 18 is, in general, lower than that of the crown of the piston 16.

To decrease the combustion chamber surface area formed in the cylinder head 18, the maximum height H of the combustion chamber 22 or the distance between the vertex (not identified) of the concavity 20 and the crown of the piston 16 at top dead center is selected within the range of 0.19 to 0.29 times a stroke S of the moving piston 16 or the distance between the piston 16 at top dead center and at bottom dead center, in which the compression ratio $\epsilon$ of the engine is within the range of 7.0 to 10.0. The vertex of the concavity 20 almost resides in the center axis O of the cylinder 14. If no concavity is formed in the cylinder head 18 as in the heron type combustion chamber, the maximum height H may be the distance between the cylinder head surface and the crown defining the combustion chamber. The range of the maximum height H of combustion chamber 22 is determined also in consideration of obtaining a required compression ratio. It is to be noted that a range of the combustion chamber volumes is necessary to obtain the required compression ratio though the decrease of the combustion chamber surface area may reduce a so-called quench area at which the flame produced by the spark plug will go out. With respect to the above-mentioned range of the maximum height H of the combustion chamber 22: if it exceeds its upper limit or 0.29 times the piston stroke S, the experiments reveal that the level of residual HC materially increase and the deterioration of the fuel consumption characteristics is remarkable; if it is lower than its lower limit or 0.19 times the piston stroke S, the diameters of the intake and exhaust valves 26 and 28 and respective seats can not be formed sufficiently large to obtain required volumetric efficiency and scavenging efficiency. It is preferable that the surfaces of the intake and exhaust valve seats are parallel with the longitudinal axis of the cylinder head, and the center axes of the stems of the intake and exhaust valve heads 26 and 28 intersect generally perpendicularly the combustion chamber surface. This configuration is easily achieved by applying the above-mentioned range of the maximum height H of the combustion chamber 22. In connection with the combustion chamber maximum height H, the crown of the piston 16 is formed into a flat shape or a shape in which a concavity is formed at the piston crown as shown in FIG. 2.

Figure 3:
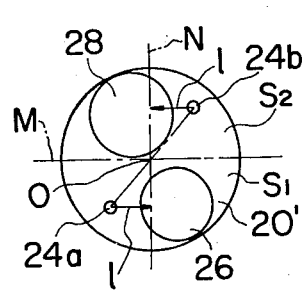
FIG. 3 is a schematical plan view of a part of the cylinder head of a modified example of an internal combustion engine in accordance with the present invention.
Figure 4:
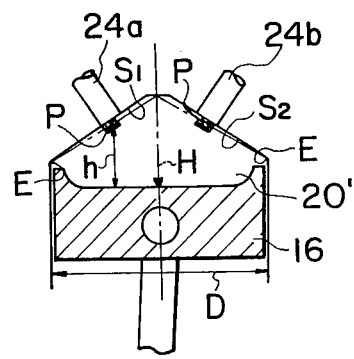
FIG. 4 is a schematical vertical section view of the engine of FIG. 3.

FIGS. 3 and 4 show the arrangement in case of the pent-roof type combustion chamber 20', in which two flat inclined concavity surfaces $S_1$ and $S_2$ intersect or meet at or in the vicinity of the longitudinal vertical imaginary plane M, in which the spark plug 24a and the intake valve head 26 are disposed on one inclined flat surface $S_1$ while the spark plug 24b and the exhaust valve head 28 are disposed on the other flat surface $S_2$. In this case, the experiments revealed that most preferably the spark plugs 24a and 24b are located such that the extensions of lines each of which connects the periphery E of the cylinder bore end portion and the midpoints P between the electrodes of each of the two spark plugs 24a and 24b intersect the cylinder center axis O at a point adjacent the vertex of the concavity 20', the vertex corresponding to the point at which the maximum height H of the combustion chamber is measured. With this configuration, the minimum distance $l$ of the midpoint P of each spark plug from the lateral vertical plane N falls within the range of 0.1 to 0.3 times the cylinder bore diameter D, and the minimum distance $h$ of the midpoint P of the electrodes of each spark plug from the piston crown becomes 0.125 times the cylinder bore diameter D. In this connection, the cylinder bore diameter D is set in the range from 0.8 to 1.2 times the piston stroke S, in which the distance between the midpoints P of electrodes of the two spark plugs 24a and 24b falls within the range from 0.45 to 0.67 times the cylinder bore diameter D as mentioned before.

As apparent from the foregoing discussion, the engine arranged according to the present invention can effectively suppress the generation of NOx in the combustion chamber and lower the levels of residual HC. The effects and advantages of the engine according to the present invention will be discussd hereinafter in comparison with other NOx control measures.

Figure 5:
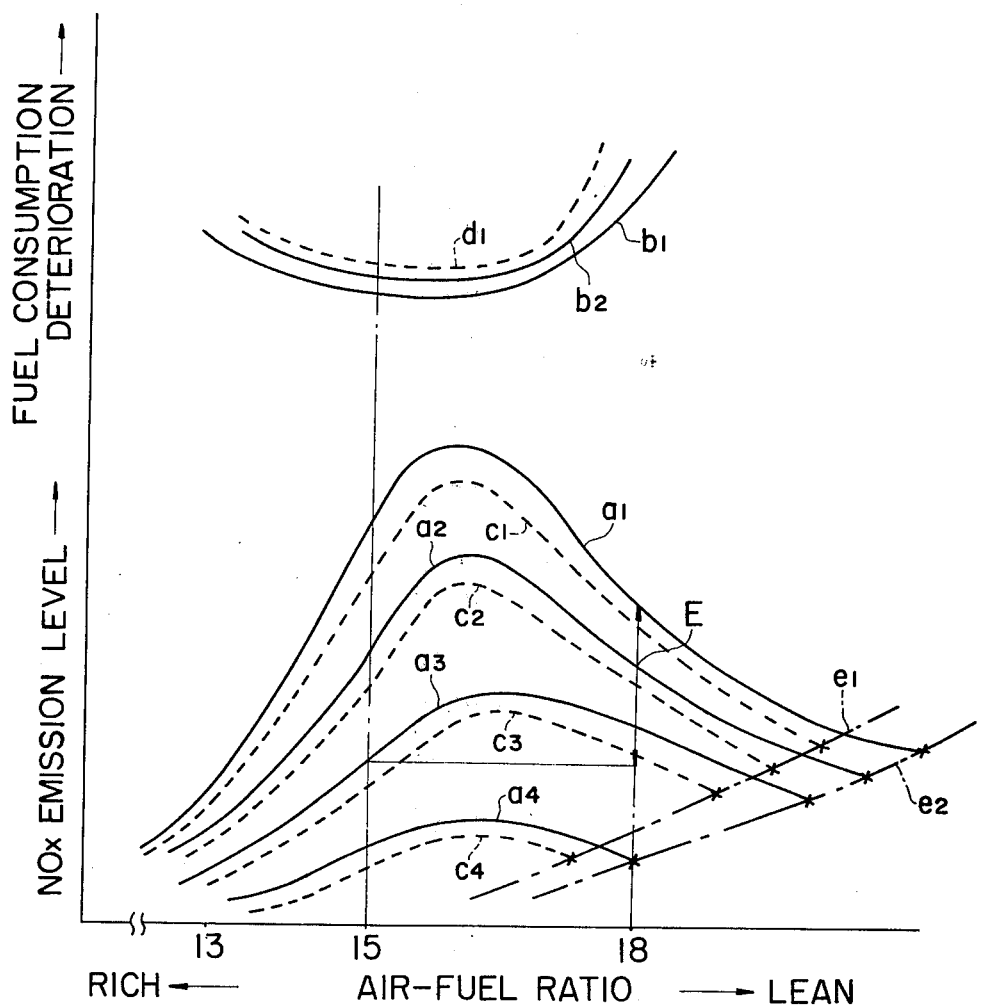
FIG. 5 is a graph showing variations of the emission level of nitrogen oxides and the fuel consumption of engines in terms of air-fuel ratio and the amount of exhaust gases supplied to the combustion chamber of the engines.

FIG. 5 shows a graph representing the variations of NOx emission level and fuel consumption characteristics in terms of air-fuel ratio of the mixture supplied to the combustion chamber of the engine and amount of the exhaust gases supplied to the combustion chamber with respect to the amount of the intake air inducted into the combustion chamber. This graph was experimentally plotted by the inventors. In this graph, solid lines $a_1$, $a_2$, and $a_4$ indicate the NOx emission level variations when the amounts of the exhaust gases supplied to the combustion chamber are 0%, 10%, 20%, and 40% by volume with respect to the amount of intake air. Solid lines $b_1$ and $b_4$ indicate the fuel consumption characteristics when the amounts of the exhaust gases supplied to the combustion chamber are 0% and 40% by volume with respect to the amount of intake air, respectively. It is seen from this graph that as the amount of the exhaust gases supplied to the combustion chamber increases, the emission level of NOx is lowered. Additionally, the fuel consumption is not remarkably deteriorated by increase of the amount of the exhaust gases supplied to the combustion chamber.

Now, it is known that the emission level of NOx is variable in terms of air-fuel ratio of the mixture supplied to the combustion chamber of the engine. The NOx emission level, in general, reaches its maximum in the vicinity of the stoichiometric air-fuel ratio, and decreases at air-fuel ratio ranges higher and lower than stoichiometric. Accordingly, NOx emission level can be considerably lowered by supplying the combustion chamber with a lean air-fuel mixture having an air-fuel ratio, e.g. ranging from 18:1 to 20:1, without supplying exhaust gases into the combustion chamber. However, if a further leaner air-fuel mixture is supplied into the combustion chamber intending to further lower the NOx emission level, the combustion in the combustion chamber will become unstable and accordingly stable and smooth running of the engine will fail.

The above-mentiond NOx emission level lowering results from the fact that the amount of gases or air which does not participate in the combustion is increased by leaning out the air-fuel mixture supplied into the combustion chamber, i.e., increasing the proportion of air in the air-fuel mixture. The existence of air not participating in the combustion contributes to increase the heat capacity of the gases in the combustion chamber and therefore the maximum temperture of the combustion carried out in the combustion chamber is suppressed. Also in case where a rich air-fuel mixture is supplied to the combustion chamber, an excess amount of fuel effects to cool the combustion gases in the combustion chamber and therefore the maximum combustion temperature is similarly suppressed.

The presence of the exhaust gases in the combustion chamber can suppress the maximum combustion temperature by the similar reason as to the above-described cases. Now, between the case where the exhaust gases supplied to the combustion chamber and the case where the lean air-fuel mixture is supplied to the combustion chamber, NOx emission level lowering effects will be hereinafter compared with reference to the graph shown in FIG. 5. For instance, the supply of the exhaust gases in the amount of 20% to the amount of intake air (at the stoichiometric air-fuel ratio) corresponds to an air-fuel ration of about 18:1 without supply of the exhaust gases. This air-fuel ratio of about 18:1 equals to the stoichiometric air-fuel mixture added with air in the amount of 20% by volume to the amount of intake air. It is apparent from the graph of FIG. 5 that the significant difference E in NOx emission level lowering effect exists between these two cases. This difference E results from the fact that the specific heat of the exhaust gases is greater than that of the air and accordingly a larger amount of combustion heat is necessary for heating up the exhaust gases than the air. It will be understood from the above that the maximum temperature of the combustion carried out in the combustion chamber is greatly lowered by supply of the exhaust gases into the combustion chamber as compared with supply of the lean air-fuel mixture without supply of the exhaust gases. In consideration of noticeable deterioration of the fuel consumption characteristics in the lean air-fuel mixture supply case, it is to be seen that NOx control measures employed in the engine according to the present invention are excellent in both Nox control and fuel consumption characteristics as compared with the other Nox control measures. Compared with a prior art engine which uses only one spark plug in each combustion chamber, the engine according to the present invention can run smoothly and stably in spite of supplying the combustion chamber with a considerably large amount of exhaust gases which may normally cause unstable running of the prior art engine. Therefore, the engine according to the present invention can decrease Nox emission to a level which is never obtained by the prior art engine in which only one spark plug is disposed in each combustion chamber.

It will be understood from the foregoing description, that the engine according to the present invention is preferably operated at least at normal engine operating range on an air-fuel mixture having an air-fuel ratio in the vicinity of stoichiometric one in order to improve the stability of the engine running and the fuel consumption characteristics of the engine. The experiments revealed that more preferably the air-fuel ratio of the mixture supplied from the means 33 to the combustion chamber 22 is, in average, within the range from 13:1 to 16:1 in consideration of fuel consumption characteristics, engine running stability, and Nox emission level lowering effect.

Finally, the NOx control measures used in the engine according to the present invention will be discussed in comparison with an NOx control measure in which a retardation of ignition timing is made. In the graph of FIG. 5, broken lines $c_1$, $c_2$, $c_3$, and $c_4$ respectively indicate the NOx emission level variations when the ignition timing is retarded and the exhaust gases are supplied into the combustion chamber in the amounts resulting in NOx emission levels expressed by the solid lines $a_1$, $a_2$, $a_3$, $a_4$. A broken line $d_1$ indicates the fuel consumption characteristics when no exhaust gas is supplied into the combustion chamber. As apparent from the graph, in the engine according to the present invention, it becomes possible to further lower the NOx emission level by retarding the ignition timing. However, the stable operating limit (range) of the engine indicated by a dash-and-dot line $e_1$ is narrowed by thus retarding the ignition timing as compared with the same limit (range) indicated by a dash-and-dot line $e_2$ of the case where the engine is operated at the ignition timing of minimum advance required for best torque (M. B. T.). Therefore, the ignition timing of the engine is preferably set in the vicinity of M. B. T. This ignition timing in the vicinity of M. B. T. is preferable in combination with the above-mentioned siamesed exhaust port arrangement and a port liner covering the surface of the siamesed exhaust port for the purpose of preventing loss of heat of the exhaust gases discharged from the combustion chamber. It is to be noted that the ignition timing of the two spark plugs 24a and 24b are preferably simultaneous in consideration of fuel consumption characteristics, stability of engine running, and structural configuration of the ignition system.

What is claimed is:

1. An internal combustion engine having a cylinder formed in a cylinder block thereof, comprising:

a combustion chamber defined by the crown of a piston reciprocally movably disposed in the cylinder and a cylinder head secured to the cylinder block to close one end of the cylinder, said combustion chamber being divided into first, second, third, and fourth imaginary parts by a vertical longitudinal plane parallel to the longitudinal axis of the cylinder head and passing through the center axis of the cylinder, and a lateral vertical plane perpendicular to the vertical longitudinal plane and passing through the center axis of the cylinder;

two spark plugs disposed so that the midpoints of central and side electrodes thereof are respectively located at the first and second imaginary parts of said combustion chamber;

intake and exhaust valve heads disposed so that the centers thereof are respectively located at the third and fourth imaginary parts of said combustion chamber;

means for supplying a portion of the exhaust gases of the engine into said combustion chamber.

2. An internal combustion engine as claimed in claim 1, in which one of said spark plugs and said intake valve head are located opposite to the other of said spark plugs and said exhaust valve head with respect to the longitudinal vertical plane.

3. An internal combustion engine as claimed in claim 2, in which the first and second imaginary parts of the combustion chamber are generally symmetrically opposite with respect to the center axis of the cylinder, and the third and fourth imaginary parts of the combustion chambers are generally symmetrically opposite to the center axis of the cylinder.

4. An internal combustion engine as claimed in claim 3, in which said two spark plugs are located generally symmetrical with respect to the center axis of the cylinder, the distance between the midpoints of electrodes of said two spark plugs being 0.45 to 0.67 times the diameter of the cylinder bore.

5. An internal combustion engine as claimed in claim 4, further comprising an intake port communicable through an intake valve with the combustion chamber and open to one side of the cylinder head, and an exhaust port communicable through an exhaust valve with the combustion chamber and open to the opposite side of the cylinder head.

6. An internal combustion engine as claimed in claim 5, further comprising another combustion chamber defined by the crown of a piston reciprocally movably disposed in another cylinder formed in the cylinder block and a cylinder head secured to the cylinder block to close one end of the cylinder, and another exhaust port communicable through another exhaust valve with the other combustion chamber, in which the two exhaust ports communicable with the two combustion chambers are combined in the cylinder head so that the outlets of the exhaust ports are formed into one outlet.

7. An internal combustion engine as claimed in claim 3, further comprising a cam shaft which is arranged to actuate through rocker arms said intake and exhaust valves.

8. An internal combustion engine as claimed in claim 4, in which the maximum distance between the cylinder head and the crown of the piston at top dead center is within the range from 0.19 to 0.29 times a stroke of the piston.

9. An internal combustion engine as claimed in claim 8, in which the combustion chamber is generally of the shape of a body of rotation the axis of which corresponds to the cylinder center axis.

10. An internal combustion engine as claimed in claim 8, in which said combustion chamber is of a pent-roof type, the pent-roof type combustion chamber being defined by two inclined flat surfaces of the cylinder head, the two inclined flat surfaces intersecting in the vicinity of the longitudinal vertical plane, in which one of said two spark plugs and said intake valve head are disposed at the one inclined flat surface, and the other of said two spark plugs and said exhaust valve head are disposed at the other inclined flat surface.

11. An internal combustion engine as claimed in claim 10, in which each spark plug is located such that the minimum distance between the lateral vertical plane and the midpoint between the center and side electrodes of the spark plugs is in the range from 0.1 to 0.3 times the bore diameter of the cylinder.

12. An internal combustion engine as claimed in claim 11, in which each spark plug is located such that the minimum distance/between the piston crown and the midpoint between the center and side electrodes of the spark plug is about 0.125 times the bore diameter of the cylinder.

13. An internal combustion engine as claimed in claim 12, in which the bore diameter of the cylinder is within the range from 0.8 to 1.2 times the stroke of the piston.

14. An internal combustion engine as claimed in claim 1, in which the exhaust gas supply means is arranged to control the maximum amount of the exhaust gases supplied to the combustion chamber in the range from 20 to 40% by volume of the amount of intake air inducted into the combustion chamber.

15. An internal combustion engine as claimed in claim 1, further comprising means for supplying said combustion chamber with an air-fuel mixture having an air-fuel ratio in the vicinity of a stoichiometric one.

16. An internal combustion engine as claimed in claim 15, in which the air-fuel ratio of the mixture is within the range from 13:1 to 16:1 in case which the fuel is gasoline.

17. An internal combustion engine as claimed in claim 4, in which said two spark plugs are arranged to simultaneously ignite the air-fuel mixture in the combustion chamber, in which the ignition timings of said two spark plugs are set in the vicinity of minimum advance required for best torque.

* * * * *